US 9,255,986 B2

(12) United States Patent
Deliwala

(10) Patent No.: US 9,255,986 B2
(45) Date of Patent: Feb. 9, 2016

(54) METHOD OF LOCATING AN OBJECT IN 3D

(75) Inventor: Shrenik Deliwala, Andover, MA (US)

(73) Assignee: ANALOG DEVICES, INC., Norwood, MA (US)

(*) Notice: Subject to any disclaimer, the term of this patent is extended or adjusted under 35 U.S.C. 154(b) by 558 days.

(21) Appl. No.: 12/499,335

(22) Filed: Jul. 8, 2009

(65) Prior Publication Data
US 2009/0281765 A1    Nov. 12, 2009

Related U.S. Application Data

(63) Continuation of application No. 12/327,511, filed on Dec. 3, 2008.

(60) Provisional application No. 61/052,121, filed on May 9, 2008, provisional application No. 61/052,125, filed on May 9, 2008.

(51) Int. Cl.
*G01B 11/00* (2006.01)
*G01S 5/16* (2006.01)
*A63F 13/20* (2014.01)
*G01S 3/783* (2006.01)
*G01S 5/00* (2006.01)

(52) U.S. Cl.
CPC ............ *G01S 5/163* (2013.01); *A63F 13/06* (2013.01); *G01S 3/783* (2013.01); *A63F 2300/1031* (2013.01); *A63F 2300/1087* (2013.01); *A63F 2300/6045* (2013.01); *G01S 5/0009* (2013.01)

(58) Field of Classification Search
CPC ........................................................ G06F 3/033
USPC ................................. 345/156–158; 178/18.01
See application file for complete search history.

(56) References Cited

U.S. PATENT DOCUMENTS

| 4,441,810 A | 4/1984 | Momose et al. |
| 4,688,933 A * | 8/1987 | Lapeyre ................. 356/3.16 |

(Continued)

FOREIGN PATENT DOCUMENTS

| CN | 1989895 A | 7/2007 |
| EP | 0271340 A1 | 6/1988 |

(Continued)

OTHER PUBLICATIONS

PCT International Search Report and Written Opinion for PCT/US2009/041539 mailed on Aug. 5, 2009.

(Continued)

*Primary Examiner* — Grant Sitta
(74) *Attorney, Agent, or Firm* — Kenyon & Kenyon LLP

(57) ABSTRACT

Methods and devices for calculating the position of a movable device are disclosed. The device may include multiple optical detectors (ODs) and the movable device may include light sources. Optics may be above the ODs. A controller may calculate the position of the light source based on data from the ODs and properties of the optics. The device may be a game console, and the light source may be a game controller. The roles of the OD and light sources may be interchanged. The rotation of the movable device may be determined using multiple light sources and/or multiple ODs on the movable device. The movable device may calculate its position and transmit it to a console. The light sources may be modulated by time or frequency to distinguish between the light sources. There may be two or more movable devices. There may be two or more consoles.

23 Claims, 11 Drawing Sheets

(56) References Cited

U.S. PATENT DOCUMENTS

| | | | |
|---|---|---|---|
| 4,956,546 | A | 9/1990 | Nishibe et al. |
| 4,999,483 | A | 3/1991 | Okamoto |
| 5,187,540 | A | 2/1993 | Morrison |
| 5,196,689 | A | 3/1993 | Sugita et al. |
| 5,264,910 | A | 11/1993 | Hill |
| 5,305,091 | A | 4/1994 | Gelbart et al. |
| 5,361,117 | A * | 11/1994 | Nonaka ............ 396/109 |
| 5,367,373 | A | 11/1994 | Busch-Vishniac et al. |
| 5,422,693 | A | 6/1995 | Vogeley et al. |
| 5,483,060 | A | 1/1996 | Sugiura et al. |
| 5,527,822 | A | 6/1996 | Scheiner |
| 5,574,479 | A | 11/1996 | Odell |
| 5,598,187 | A | 1/1997 | Ide et al. |
| 5,604,695 | A | 2/1997 | Cantin et al. |
| 5,627,565 | A | 5/1997 | Morishita et al. |
| 5,644,126 | A | 7/1997 | Ogawa |
| 5,644,385 | A | 7/1997 | Mizuno |
| 5,719,670 | A | 2/1998 | Duboz et al. |
| 5,793,353 | A | 8/1998 | Wu |
| 5,796,387 | A | 8/1998 | Curran et al. |
| 5,825,481 | A | 10/1998 | Alofs et al. |
| 5,892,501 | A | 4/1999 | Kim et al. |
| 5,900,863 | A | 5/1999 | Numazaki |
| 5,909,296 | A | 6/1999 | Tsacoyeanes |
| 5,974,365 | A | 10/1999 | Mitchell |
| 6,014,129 | A | 1/2000 | Umeda et al. |
| 6,026,313 | A | 2/2000 | Kexin |
| 6,130,663 | A | 10/2000 | Null |
| 6,181,877 | B1 | 1/2001 | Yoshida |
| 6,274,862 | B1 | 8/2001 | Rieger |
| 6,280,327 | B1 | 8/2001 | Leifer et al. |
| 6,330,064 | B1 | 12/2001 | Rieder |
| 6,343,171 | B1 | 1/2002 | Yoshimura et al. |
| 6,473,189 | B1 * | 10/2002 | Reedy ............ 356/623 |
| 6,495,833 | B1 | 12/2002 | Alfano et al. |
| 6,498,860 | B1 | 12/2002 | Sasaki et al. |
| 6,521,882 | B1 | 2/2003 | Sumiya et al. |
| 6,529,281 | B2 | 3/2003 | Takeshita et al. |
| 6,567,071 | B1 * | 5/2003 | Curran et al. .......... 345/158 |
| 6,597,443 | B2 | 7/2003 | Boman |
| 6,997,879 | B1 | 2/2006 | Turcott |
| 7,012,691 | B2 * | 3/2006 | Sugiyama et al. ........ 356/429 |
| 7,158,659 | B2 | 1/2007 | Baharav et al. |
| 7,352,477 | B2 | 4/2008 | Seo |
| 7,461,543 | B2 | 12/2008 | Degertekin |
| 7,473,884 | B2 * | 1/2009 | Fouquet et al. .......... 250/221 |
| 7,505,033 | B2 | 3/2009 | Guo et al. |
| 7,655,937 | B2 | 2/2010 | Hotelling et al. |
| 7,737,409 | B2 | 6/2010 | Deliwala et al. |
| 7,787,122 | B2 | 8/2010 | Saito et al. |
| 7,852,317 | B2 | 12/2010 | Grunnet-Jepsen et al. |
| 7,931,535 | B2 | 4/2011 | Ikeda et al. |
| 7,944,551 | B2 | 5/2011 | Addison et al. |
| 7,978,311 | B2 | 7/2011 | Deliwala |
| 8,022,928 | B2 | 9/2011 | Ye |
| 8,133,769 | B1 | 3/2012 | Tivarus |
| 8,310,656 | B2 | 11/2012 | Zalewski |
| 2001/0043337 | A1 | 11/2001 | Takeshita et al. |
| 2002/0053635 | A1 | 5/2002 | Schroter et al. |
| 2003/0090650 | A1 | 5/2003 | Fujieda |
| 2003/0223085 | A1 * | 12/2003 | Rekimoto ............ 356/614 |
| 2004/0135825 | A1 | 7/2004 | Brosnan |
| 2004/0222969 | A1 | 11/2004 | Buchenrieder |
| 2004/0225207 | A1 | 11/2004 | Bae et al. |
| 2004/0266528 | A1 | 12/2004 | Wang |
| 2005/0259097 | A1 | 11/2005 | Lehoty et al. |
| 2007/0018970 | A1 | 1/2007 | Tabasso et al. |
| 2007/0078311 | A1 | 4/2007 | Al-Ali et al. |
| 2007/0103698 | A1 | 5/2007 | Liu et al. |
| 2007/0138377 | A1 | 6/2007 | Zarem |
| 2007/0165225 | A1 | 7/2007 | Trainer |
| 2007/0252821 | A1 | 11/2007 | Hollemans et al. |
| 2007/0265075 | A1 * | 11/2007 | Zalewski ............ 463/36 |
| 2008/0009690 | A1 | 1/2008 | Debreczeny et al. |
| 2008/0013826 | A1 | 1/2008 | Hillis et al. |
| 2008/0089587 | A1 | 4/2008 | Kim et al. |
| 2008/0100825 | A1 | 5/2008 | Zalewski |
| 2008/0150898 | A1 | 6/2008 | Low et al. |
| 2008/0215974 | A1 | 9/2008 | Harrison et al. |
| 2008/0220814 | A1 | 9/2008 | Hedtke et al. |
| 2008/0221418 | A1 | 9/2008 | Al-Ali et al. |
| 2008/0278445 | A1 | 11/2008 | Sweetser et al. |
| 2009/0062667 | A1 | 3/2009 | Fayram et al. |
| 2009/0078858 | A1 | 3/2009 | Fouquet et al. |
| 2009/0085869 | A1 | 4/2009 | Destura et al. |
| 2009/0091532 | A1 | 4/2009 | Hockett |
| 2009/0092284 | A1 | 4/2009 | Breed et al. |
| 2009/0280843 | A1 | 11/2009 | Wisebourt et al. |
| 2009/0325408 | A1 | 12/2009 | Wong et al. |
| 2010/0231513 | A1 | 9/2010 | Deliwala |
| 2010/0271617 | A1 | 10/2010 | Damink et al. |
| 2010/0277431 | A1 | 11/2010 | Klinghult |
| 2010/0305418 | A1 | 12/2010 | Deliwala |
| 2010/0309457 | A1 | 12/2010 | Cui et al. |
| 2012/0280107 | A1 | 11/2012 | Skurnik et al. |

FOREIGN PATENT DOCUMENTS

| | | |
|---|---|---|
| EP | 0905646 A1 | 3/1999 |
| WO | 00/07148 | 2/2000 |

OTHER PUBLICATIONS

EP Communication including Supplementary European Search Report issued in EP Appln. No. 10781029.3, dated Jun. 27, 2014, 6 pages.

PCT International Search Report and Written Opinion issued in PCT/US2010/036438, dated Jul. 27, 2010, 9 pages.

PCT International Search Report and Written Opinion issued in PCT/US2010/035604, dated Jul. 26, 2010, 11 pages.

Supplementary EP Search Report issued in EP Application No. 10781228, dated Jul. 31, 2014, 9 pages.

PCT International Search Report and Written Opinion for PCT/US2012/066969 mailed on Feb. 6, 2013, 13 pages.

* cited by examiner

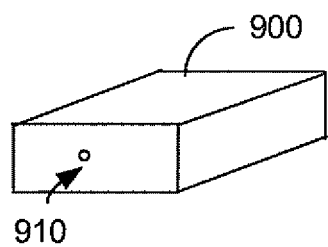
FIG. 9A
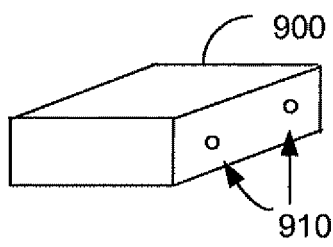
FIG. 9B
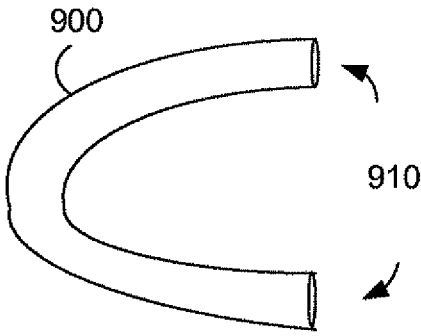
FIG. 9C
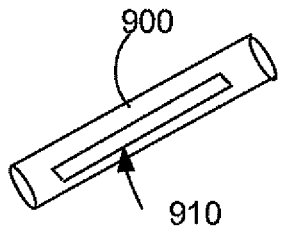
FIG. 9D
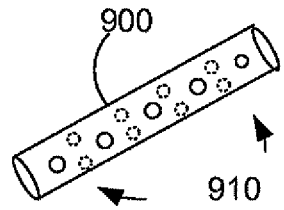
FIG. 9E
FIG. 9

METHOD OF LOCATING AN OBJECT IN 3D

CROSS REFERENCE TO RELATED APPLICATIONS

This application is a continuation of U.S. Ser. No. 12/327,511, filed on Dec. 3, 2008, which claims priority under 35 U.S.C. §119 (e) to U.S. Provisional Application No. 61/052,121, filed on May 9, 2008, with title "Method of Locating an Object in 3D"; and to U.S. Provisional Application 61/052,125, filed on May 9, 2008, with title "Optical Distance Measurement By Triangulation of an Active Transponder".

FIELD OF INVENTION

The present invention relates to calculating the position of a movable object, and more particularly to calculating the position of a movable object using light

BACKGROUND

The advantages of being able to calculate the location of a moveable device are enormous, but measuring the location of a movable device can be difficult. And many applications need to track a movable device by repeatedly measuring the location of the movable device. Some known devices have problems. Devices based on gyroscopes are prone to accumulating errors and need to be reset periodically. Devices based on measuring radio waves may suffer from interference from many other devices that generate radio waves. Devices based on videoing the real person or lights attached to the real person (or object) and then calculating the person's (or object's) location by computational methods requires expensive hardware to implement. Additionally, it may be that the movable device is wireless so that the power source must be contained in the movable device.

Therefore, there is a need in the art for reliably calculating the position of a movable device that does not rely on radio waves or gyroscopes.

BRIEF DESCRIPTION OF THE DRAWINGS

FIG. 9 illustrates embodiments of the present invention.

DETAILED DESCRIPTION

Embodiments of the present invention provide a device for calculating the position of a light source. The device may include two optical detectors, and a controller communicatively coupled to the optical detectors. The light detectors may receive incident light generated by a light source mounted on the movable device or light reflected from a light source via a reflector mounted on the movable device. The controller may be configured to calculate the position of the light source based on data from the optical detectors and properties of one or more apertures above the optical detectors. The apertures may be a slit above the optical detectors in the housing that holds the optical detectors and the controller. The device may be a game console, and the light source may be located on a game controller.

Figure 1:
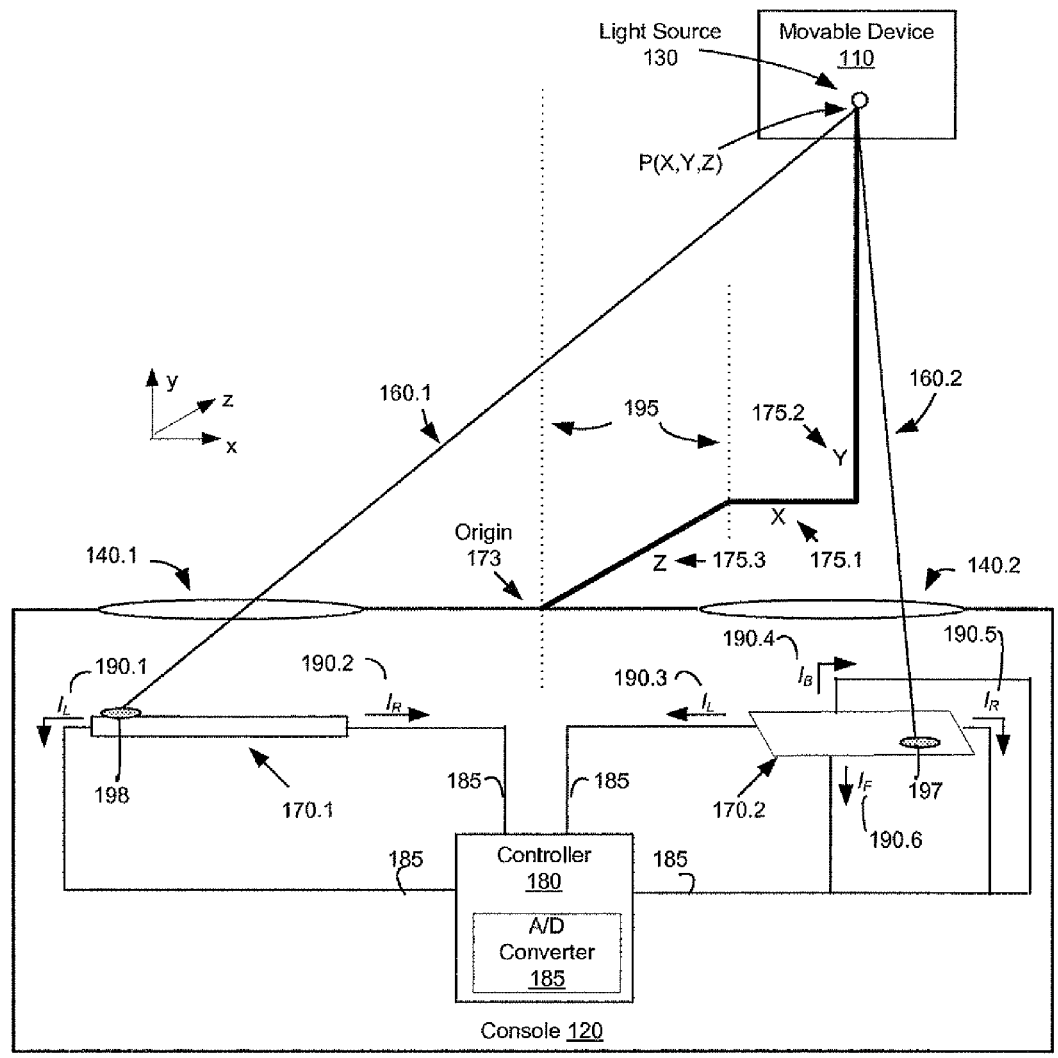
FIG. 1 illustrates an embodiment of the present invention.

FIG. 1 illustrates a system 100 according to an embodiment of the present invention. The system 100 may include one or more movable device(s) 110 and a console 120. The movable device 110 may include a light source 130 that emits or reflects light into free space. The console 120 may include apertures 140, an optical detector 170 and a controller 180. The apertures 140 may focus incoming light from the light source 130 onto a face of the optical detector 170 and may generate lateral currents 190 therefrom. When the device 110 moves in free space, the distribution of focused light on the face of the optical detector 170 may change, which may change the currents generated therefrom. The controller 180 monitors changes among the currents and may calculate the device's position in free space.

Once the controller 180 calculates the device's position in free space, the calculation may be input to other console components (not shown) as input data. In an embodiment in which the movable device 110 may be a game controller and the console 120 a video game console, the device's position may be a control input for a game character or the like. In an embodiment in which the movable device 110 may be attached to a homecare patient, the device's position may be used to track the activity of a homecare patient's activities, and the tracked activity may be uploaded to medical personal for monitoring the patient's activity or diagnosing the patient. In an embodiment in which the movable device 110 is attached to a robotic arm, the device's position provides feedback to a computer program controlling the arm.

More specifically, the position P(X,Y,Z) (X 175.1, Y 175.2, and Z 175.3) of the movable device 110 from an origin 173 of the console 120 may be calculated by the console 120. The light source 130 emits or reflects light. The apertures 140 may focus the light 160 on the optical detectors, herein 'position sensitive devices' (PSDs) 170. The PSDs 170 may generate current 190 as a result of the light 160 striking the PSDs 170. The controller 180 may calculate the position 175 of the movable device 110 based on the generated currents 190 from the PSDs 170 and based on properties of the apertures 140. The controller 180 may be connected to the PSDs 170 by wires 185. There may be electronic components (not illustrated) such as operational amplifiers, between the PSDs 170 and the controller 180. The controller 180 may include an A/D converter 185 for converting analog data from the PSDs 170 to digital data for processing by the controller 180. In an embodiment, as illustrated, there are two PSDs 170, with one being one dimensional 170.1 and one being two-dimensional 170.2. The two-dimensional PSD 170.2 generates current 190.3, 190.4, 190.5, and 190.6 (as illustrated, but alternatively or in addition voltage may be measured) that enables the controller 180 to locate the centroid of the focused light 197 on a plane of the PSD 170.2. The one-dimensional PSD 170.1 generates current 190.1 and 190.2 that enables the controller 180 to locate the centroid of the focused light 198 on a line of the PSD 170.1. The controller 180 may include an analog to digital converter 185 for converting the analog current 190 from the PSDs 170 to digital values to be operated on the controller 180. As discussed below, alternative embodiments may use different arrangements and selections of PSDs 170. For example, three one-dimensional PSDs with two oriented along the x-axis and one oriented along the y-axis. In another example, two PSDs oriented along the x-axis. Additional PSDs may be used to increase the sensitivity of the calculated measurements.

In an embodiment, the apertures 140 may be provided as slits in a housing of the console 120. Alternatively, the apertures 140 may include focusing lenses, fisheye lenses, or prisms with focal lengths tuned to a separation distance between the PSD and the lens.

For convenience, the light source 130 is described as part of the movable device 110 and the PSDs 170 and controller 180 as being part of the console 120, but the roles may be reversed with the light source 130 as part of the console 120 and the optical detectors 170 and controller 180 as part of the movable device 110. If the movable device 110 includes the optical detectors 170 and the controller 180 then the movable device 110 may need a way to communicate the calculated location of the movable device 110 to the console 120.

The light source 130 may be an LED or a laser or almost any type of light source 130 but fixed wavelength emitting devices are preferred. The movable device 110, if wireless, may include a power source such as a battery (not illustrated). Additionally, there may be additional components to the movable device 110 as discussed below. For example, the movable device 110 may include electronic components for time or frequency modulation of the emitted light.

In another embodiment, the light source 130 may reflect light generated from a light generator (not shown) and transmitted to the light source 130. The light source 130 reflects the modulated light into free space, some of which may be received at the optical detectors 170.

Alternatively, the device described above may be located on the movable device, for example, the game controller. And, the light source may be located on the other device, for example, the game console. In an embodiment, instead of two optical detectors there may be at least three optical detectors with at least one optical detector having a different orientation. In an embodiment, the device includes a housing with apertures to admit light from the light source. The apertures focus the light from the light source on the optical detectors. In an embodiment, there may be multiple light sources (and/or optical detectors) for calculating the rotation of the movable device. In an embodiment there may be multiple movable devices. In an embodiment, the controller may use triangulation to calculate the location of the light. In an embodiment, multiple lights sources each distinguishable by time or frequency are used and the rotation is calculated based on the calculated location of the light sources. In an embodiment, multiple lights sources each distinguishable by time or frequency are used and the rotation is calculated based on received spatial distribution of the light sources.

Described below is an embodiment of a method for the console to calculate the three coordinates of the movable device. Different coordinate systems may be used and many variations of the method described below are possible.

Locating a Light Spot on a One-Dimensional Optical Detector

Figure 2A:
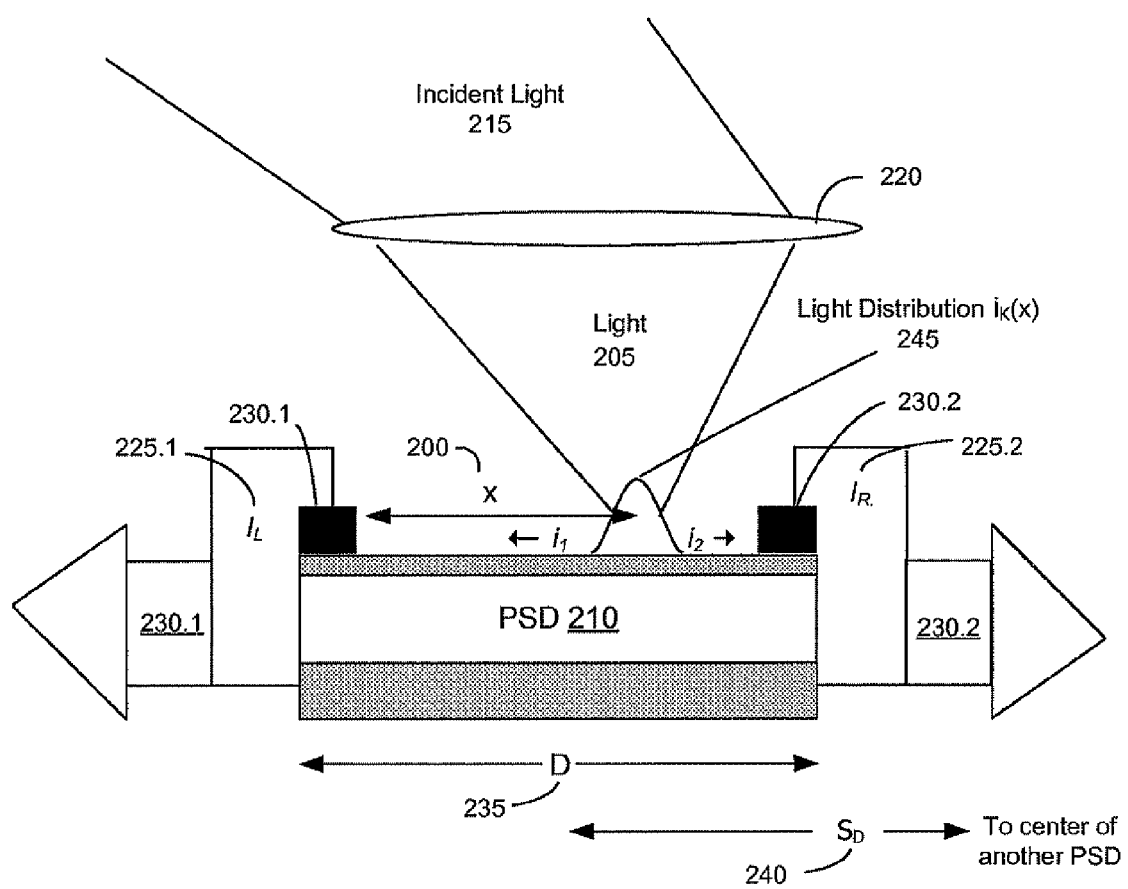
FIG. 2A illustrates measuring the location x of focused light on a one-dimensional position sensitive device.

FIG. 2A illustrates measuring the location x 200 of focused light 245 on a linear PSD 210. The incident light 215 is emitted or reflected from a light source (not illustrated). The incident light 215 passes through the aperture 220, and becomes focused light 205 that falls on the PSD 210 with light distribution 245. The incident light 215 may be modeled as if it were a light spot incident on the PSD 210. The light distribution 245 generates lateral currents $i_1$ and $i_2$ in the PSD 210 and currents $I_L$ 225.1 and $I_R$ 225.2 at respective electrical contacts 230.1, 230.2, which are provided at opposite ends of the linear PSD 210. The lateral currents $i_1$ and $i_2$ will be proportionate to the incident light 215. The currents $I_L$ 225.1 and $I_R$ 225.2 may be amplified by respective amplifiers 230.1, 230.2 and may be digitized for further processing by the controller (not shown).

The incident light may be modeled as if it were a light spot incident on the PSD 210. The PSD has a length D 235. The controller may calculate the location x 200 of the spot by applying the following equation:

$$x = \left(\frac{I_L - I_R}{I_L + I_R}\right)\frac{D}{2} \equiv \left(\frac{I_L - I_R}{I_T}\right)\frac{D}{2}. \qquad 1$$

In this case, the controller may calculate x 200 from the center of the detector 210. Note that this follows from the fact that the total photocurrent generated is distributed among the two contacts 230.1, 230.2 according to the resistance of the PSD 210 surface material. The PSD 210 may be $S_D$ 240 from the center of another PSD (not illustrated).

Locating a Light Spot on a Two-Dimensional Optical Detector

Figure 2B:
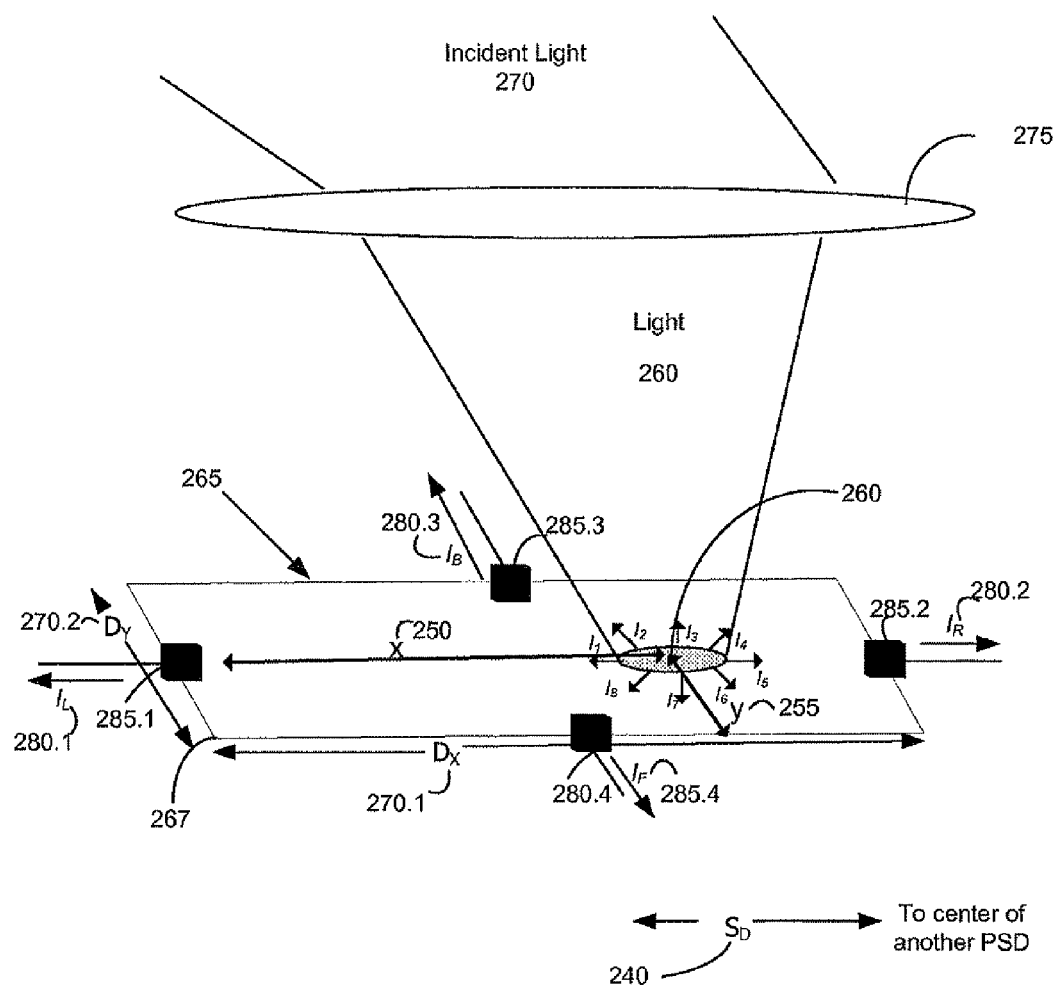
FIG. 2B illustrates measuring the location x, y of focused light on a two-dimensional position sensitive device.

FIG. 2B illustrates measuring the locations x 250 and y 255 of focused light 260 on a two-dimensional PSD 265. The incident light 270 is emitted or reflected from a light source (not illustrated). The incident light 270 passes through the aperture 275, and becomes focused light 260 that falls on the PSD 265 with light distribution 260 that generates lateral currents $i_1 \ldots i_9$ and currents $I_L$ 280.1, $I_R$ 280.2, $I_B$ 280.3, and $I_F$ 280.4 at respective electrical contacts, 285.1, 285.2, 285.3, and 285.4. The currents $I_L$ 280.1, $I_R$ 280.2, $I_B$ 280.3, and $I_F$ 280.4 may be amplified by amplifiers (not illustrated) and may be digitized for further processing by the controller (not illustrated).

The incident light may be modeled as if it were a light spot incident on the PSD 265. The PSD 265 has a length of $D_X$ 270.1 and $D_Y$ 270.2. The controller may calculate the location of x 250 and y 255 of the centroid of the spot 260 by applying the following equations:

$$y = \frac{D_y}{2}\left(\frac{I_F - I_B}{I_F + I_B}\right). \qquad 2$$

$$x = \frac{D_x}{2}\left(\frac{I_F - I_B}{I_F + I_B}\right). \qquad 3$$

In this case, the controller may calculate x 250 and y 255 from the center of the detector 265. In embodiments, the controller may calculate adjustments to x 250 and y 255 to adjust for the position of the contacts 285. For example, in an embodiment the contacts 285 may be on the edges of the PSD 265. The controller may then use equations from coordinate geometry to adjust the values for x 250 and y 255 to adjust for the contacts 285 being located on the edges of the PSD 265. In embodiments, the controller may calculate adjustments to x 250 and y 255 to adjust for the properties of the PSD 265. Note that this follows from the fact that the total photocurrent generated is distributed among the four contacts 285.1, 285.2, 285.3, and 285.4 according to the resistance of the PSD 265 surface material. The PSD 265 may be $S_D$ 240 from the center of another PSD (not illustrated).

Multiple Light Sources May be Tracked by Using Frequency or Time Modulation

The controller may calculate the position of multiple light sources using time modulation. For example, each light source may be turned on-off in a predetermined sequence such that only one of the light sources is on at any given time. In this embodiment, only the coordinate corresponding to a particular light source will be measured during a prescribed time interval. Thus, the controller may calculate positional data for all of the light sources on a time sharing basis. In an embodiment, the light sources may be pulsed and individual light sources given a window in time when each one is pulsed. The controller may then calculate the centroid of each of light source for each window of time.

Alternatively, the controller may distinguish between the light sources using frequency domain. For example, the light sources may be modulated at unique frequencies $f_k$. The currents $I_L$ and $I_R$ generated by the optical detectors in response to receiving incident light from the light sources may include frequency components characterized by these modulations, such as:

$$I_L(t) = \sum_{k=sources} \int i_{lk}(x)\cos[2\pi f_k t]xdx \quad\quad 4$$

$$I_R(t) = \sum_{k=sources} \int i_{rk}(x)\cos[2\pi f_k t]xdx.$$

In the above equation, $i_k(x)$ represent the individual spot size distributions from each of the remote light sources on the surface of the optical detectors. The controller may by using the above equations demodulate the left and the right currents $I_L$ and $I_R$ corresponding to each of the $i_k(x)$ by demodulating the currents $I_L$ and $I_R$ at each of the frequencies $f_k$. By calculating the equations above the controller may discriminate between two light spots on the PSD's surface according to frequency demodulation. The controller may then calculate the positions of the light sources using Equation 1 applied to each of the individual demodulated currents $i_{kL}(x)$ and $i_{kR}(x)$ as is disclosed herein. Thus the controller may calculate the location of multiple modulated light sources and by repeatedly calculating the location of multiple light sources the controller may track the multiple light sources.

Calculating the Position of X, Y, and Z Coordinates

Figure 3:
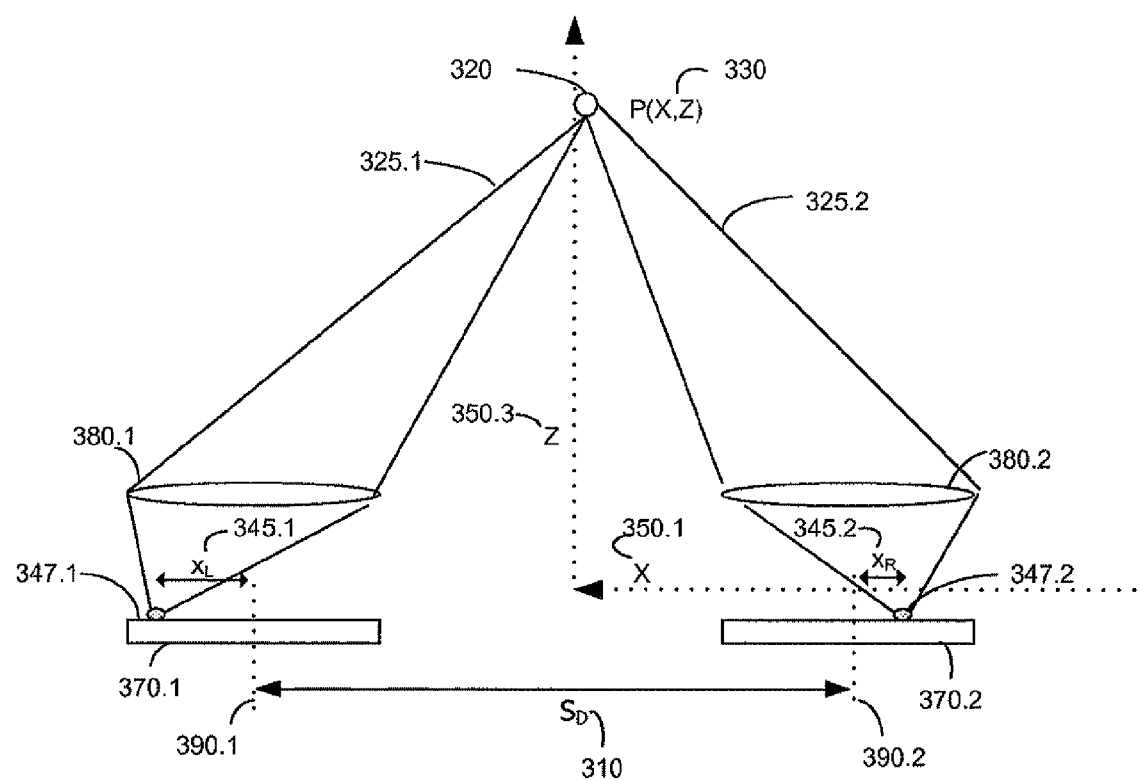
FIG. 3 illustrates the X and Z plane for computing the location of a light source for an embodiment of the present invention.

FIG. 3 illustrates the X 350.1 and Z 350.3 plane for computing the location 330 of a light source 320 for an embodiment of the present invention. A light source 320 emits or reflects light 325 that is focused by optics 380 to form spots 347.1, 347.2 on the PSDs 370. The two PSDs 370 are connected to a controller (not illustrated) which may include one or more operational amplifiers and differencing and summing instrumentation amplifier configurations to measure the location of the spots 347.1, 347.2. $S_D$ 310 is the distance between the two PSDs 370. In an embodiment, the location of the spots 347.1, 347.2 is measured relative to the center of the PSDs 390 as $x_L$ 345.1 and $x_R$ 345.2.

In an embodiment, the controller measures the centroid of the intensity distribution of the light source 320 on the surface of the PSDs 370. As described herein, the controller may calculate the position of multiple light sources using time or frequency modulation. If f is the focal length of the aperture 380, which may be a slit in a housing, then for each of the PSDs 370 the controller (not illustrated) may calculate the location of the imaging spot using the following equations:

$$x_L = \frac{f}{Z}\left(X + \frac{S_D}{2}\right) \quad\quad 5$$

$$x_R = \frac{f}{Z}\left(X - \frac{S_D}{2}\right).$$

Where $x_L$ is 345.1, $x_R$ is 345.2, Z is 350.3, and $S_D$ is 310. By calculating the above equations, the controller may calculate X 350.1 by using the following equation:

$$X = \left(\frac{S_D}{2}\right)\left(\frac{x_L - x_R}{x_L + x_R}\right). \quad\quad 6$$

Where $x_L$ is 345.1, $x_R$ is 345.2, X is 350.1, and $S_D$ is 310. Having determined lateral position, the controller may calculate the X 350.1 and Z 350.3 from both the outputs of the PSDs as:

$$Z = \frac{f}{x_L - x_R}S_D. \quad\quad 7$$

Where $x_L$ is 345.1, $x_R$ is 345.2, Z is 350.3, and $S_D$ is 310.

Referring back to FIG. 1, if one or more of the PSD 270 is two-dimensional, then the controller may calculate the Y 175.2 location directly by:

$$Y = \frac{Zy_L}{f} = \frac{Zy_R}{f} = \left(\frac{Z}{f}\right)\left(\frac{y_L + y_R}{2}\right). \quad\quad 8$$

Where Y is 175.2, $y_L$ is 190.4, $y_R$ is 190.6, and Z is 175.3. From the above equations, a controller may calculate the location of point source of light 130 by using the electrical signals generated by a pair of PSDs 170 in response to the incident light from the light source.

In an embodiment, the controller may calculate adjustments to the location 330 of the light source based on correcting calculations to compensate for distortions of the aperture 380. For example, the aperture 380 may distort the position 347 of the centroid on the surface of the PSD 370 due to distortions such as pincushion, astigmatism etc. In an embodiment, the controller may calculate adjustments to the location 330 of the light source based on distortions of the PSD 370 due to the design of the PSD 370. The controller may be calibrated for calculating the adjustments to the location 330 of the light source.

Referring to FIG. 3, in an embodiment, multiple movable devices are present and/or multiple light sources 320 on movable devices are used. Each light source 320 may be uniquely modulated, either in time or frequency, enabling the controller to directly measure the output of each of the modulations, and with simple signal processing measure the location 330 of each of the spots 347.

Calculating Rotation

Figure 4:
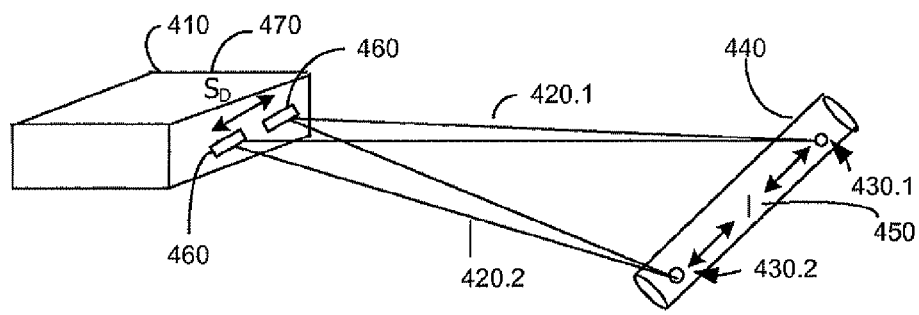
FIG. 4 illustrates an embodiment for calculating the rotation of a movable device.

FIG. 4 illustrates an embodiment for calculating the rotation of a movable device 440. A controller 410 receives light 420 at two optical detectors 460 separated by a fixed distance $S_D$ 470 from two light sources 430 that are placed on the movable device 440 and separated by a fixed distance l 450 along the x-axis. The controller 410 may distinguish between the two light sources 430 and calculate the position of each of the light sources 430 by using the methods and apparatuses disclosed herein. The controller 410 may then based on the geometry of the movable device 440 calculate the orientation of the movable device 440. Since the positions of each of the light sources 430 is determined independently, the controller 410 may calculate the directed segment (length and orientation) between light sources 430. This can provide the orientation and location of movable device 440 in space. For example, in an embodiment, the controller may calculate the rotation about the Y-axis based on changes in the measured length vector of the distance between the two light sources 430 as $(l_x, l_z) = (l\cos(\theta), l\sin(\theta))$, where $\theta$ is the rotation about the Y-axis. Similarly, the controller 410 may calculate the rotation about the X-axis. In an embodiment, additional light sources 430 separated along the y-axis are used to provide higher sensitivity to X-rotations. The controller may track the rotation of the mobile device 440 by repeatedly measuring the rotation. The role of the light sources 430 and the light detectors 460 can be reversed as is disclosed herein. Multiple light sources 430 may be attached to a rigid or flexible body and the orientation of the rigid body or parts of flexible body may be calculated.

Figure 5A:
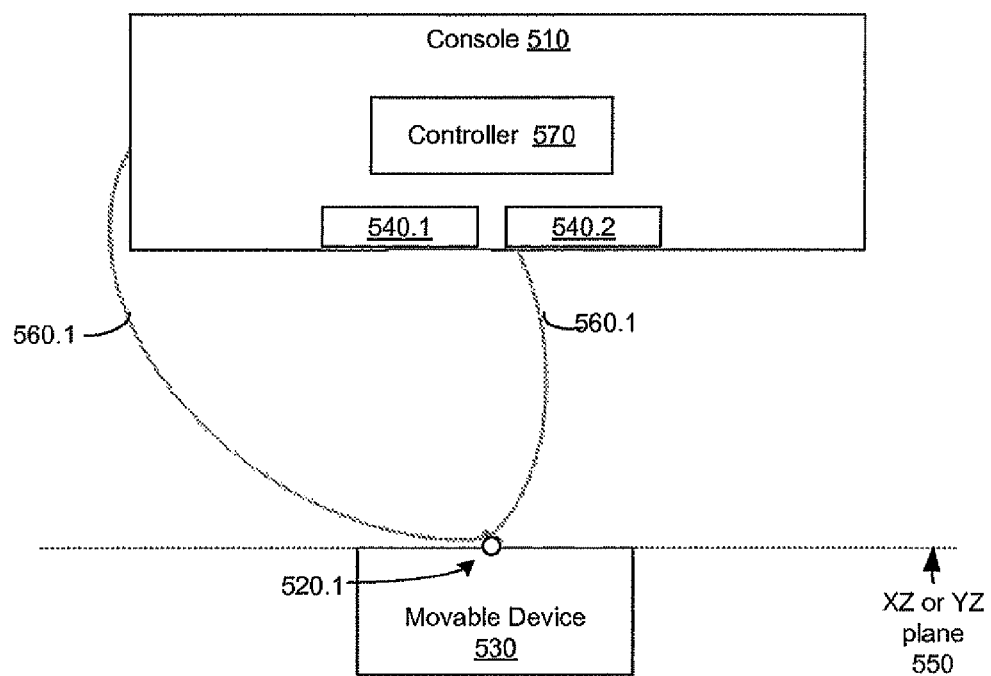
FIG. 5A illustrates an embodiment for calculating the rotation of a movable device.

FIG. 5A illustrates an embodiment for calculating the rotation of a movable device 530. A movable device 530 has a light source 520.1 that emits or reflects light 560.1 and is detected at the optical detectors 540.1 and 540.2 of the console 510.

The controller 570 may calculate the angle of the light source 520.1 based on the currents generated at the two optical detectors 540.1 and 540.2. The currents generated at the two optical detectors 540.1 and 540.2 may be based on the total light intensity striking the two optical detectors 540.1 and 540.2. For example, in FIG. 5A, optical detector 540.1 will generate more current than optical detector 540.2 due to the angular distribution of the intensity of the light source 520.1 and the position of the light source 520.1. The controller 570 may use the relative ratio of current generated at the optical detectors 540.1 and 540.2 to measure the angle of the light source 520.1 based on a known angular distribution of the light source 520.1 which varies in different directions.

Figure 5B:
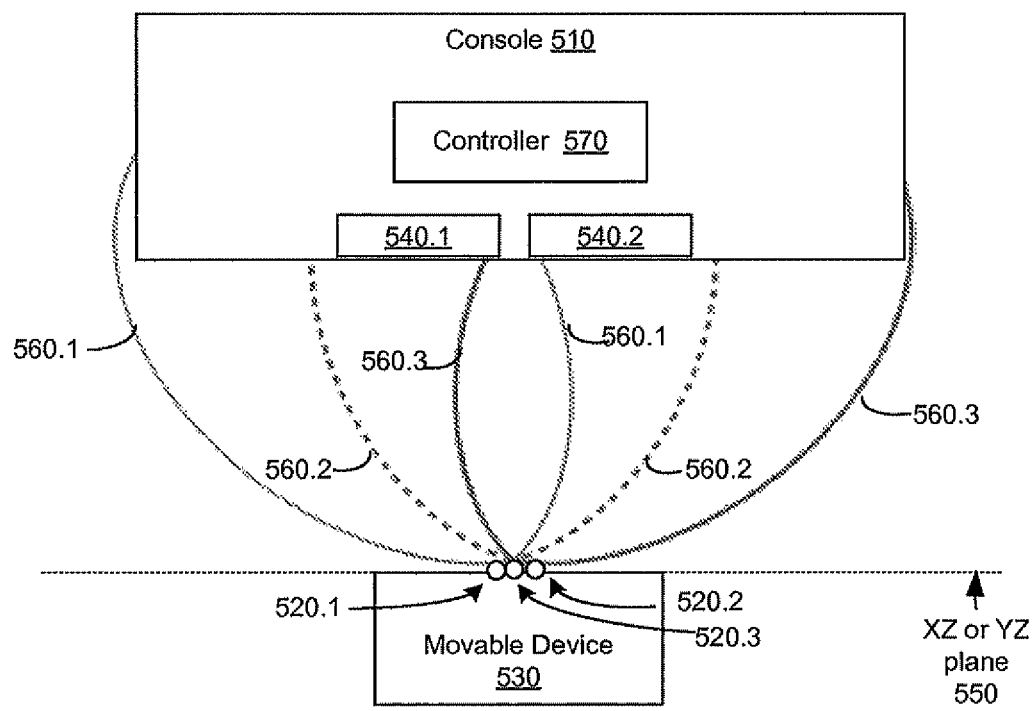
FIG. 5B illustrates an embodiment for calculating the rotation of a movable device with multiple light sources.

FIG. 5B illustrates an embodiment for calculating the rotation of a movable device 530 with multiple light sources 530. Each optical detector 540 generates currents from the incident light striking the respective optical detector 540. The controller 570 may distinguish between the light sources 520 using methods and apparatuses disclosed herein. The light sources 520 may each be oriented differently and the light sources 520 may be separated from one another. The light sources 520 may each have an angular distribution that may be used by the controller 570 to calculate the angle of the light source 520. The use of multiple optical detectors 520 may increase the accuracy of calculating the angle of the light source(s) 520.

As disclosed herein the controller may calculate the rotation about the Z-axis using information generated at a two-dimensional PSD. Thus, using the methods and apparatuses disclosed herein the rotation of a movable device 530 may be calculated by the controller.

In an embodiment, the light sources 520 may be part of the console 510 and the light detector 520 part of the movable device 530. In an embodiment, the light sources 520 may be spaced out rather than being pointed at different angles. In an embodiment, the controller 570 may calculate the angle of the light source(s) 520 based on voltages generated at the optical detectors 540.

Role of Light Source and Light Detector May be Reversed

Figure 6A:
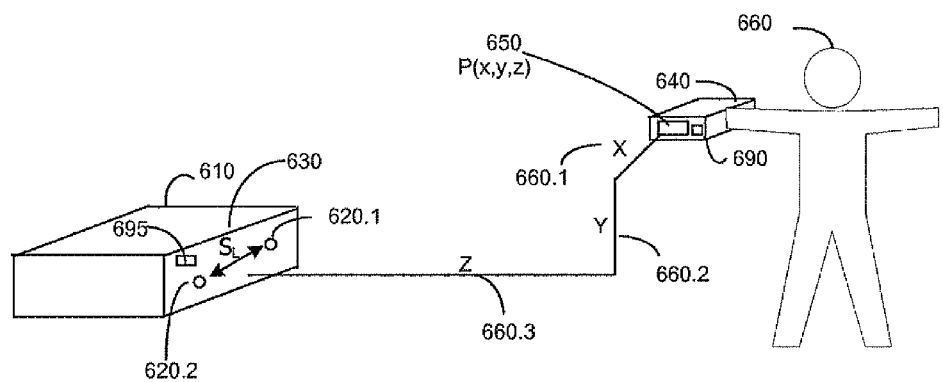
FIG. 6A illustrates an embodiment of the present invention with two light sources on a console and a light detector on a movable device being held by a person.

FIG. 6A illustrates an embodiment of the present invention with two light sources 620 on a console 610 and a light detector 650 on a movable device 640 being held by a person 660. Two light sources 620 emit or reflect light (not illustrated) that is detected by the light detector 650 attached to a movable device 640 which may calculate the position P(X,Y,Z) 650 of the movable device 640 based on the received light. The movable device 640 may transmit the calculated position to the console 610 using an IR transmitter 690. The console 610 may receive the position 650 of the movable device 640 by an IR receiver 695. As illustrated below, the roles of the light detectors 650 and the light sources 620 may be interchangeable.

Two light sources 620 can be used at a fixed separation $S_L$ 630 with a single light detector 650 part of a movable device 640. The two light sources 620.1 and 620.2 form two spots on the light detector 650 because of the aperture 670 provided within the movable device 640.

Figure 6B:
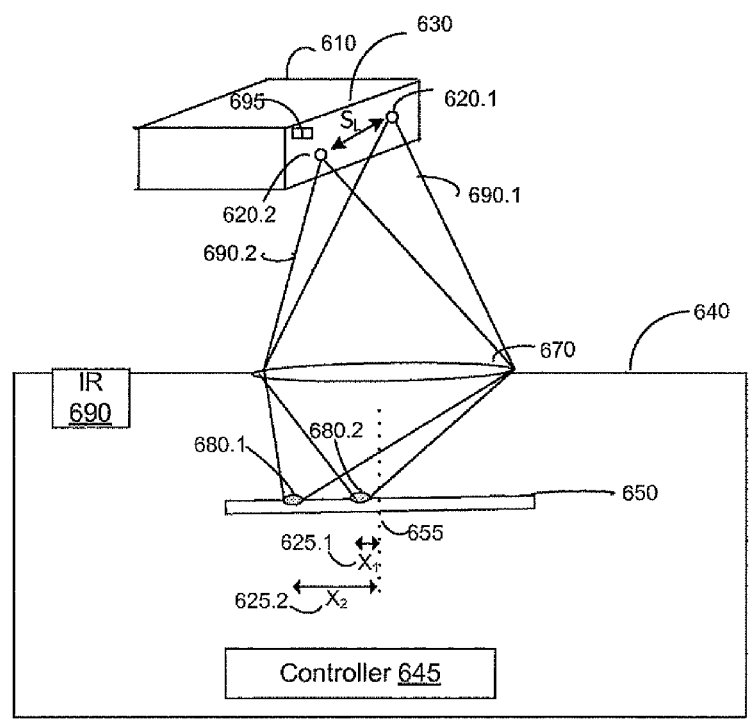
FIG. 6B illustrates a movable device with the two spots on the light detector formed from two light sources emitting or reflecting light.

FIG. 6B illustrates the movable device 640 with the two spots 680 on the light detector 650 formed from the two light sources 620 emitting or reflecting light 690 that passing through the aperture 670. The controller 645 may distinguish between the two light sources 620 using methods and apparatuses disclosed herein. The controller 645 may calculate the X 660.1 and Y 660.2 coordinates by using the following equations:

$$X = \frac{x_1 + x_2}{2}. \quad\quad 9$$

$$Y = \frac{y_1 + y_2}{2}. \quad\quad 10$$

Where, $x_1$ 625.1 and $x_2$ 625.2 are the position of the two spots 680 from the center 655 of the light detector 650. The Y 660.2 may be calculated with data from either a two-dimensional light detector 650 or with a second light detector 650 (not illustrated, which may be differently oriented than the light detector 650 and may be oriented along the y-axis). The controller 645 may calculate the distance Z 660 from the two light sources 620 by using stored values of the separation $S_L$ of the light detector 650 and stored values of the focal length f of the aperture 670. The controller 640 may then calculate Z by using the following equation:

$$Z = \frac{f}{(x_2 - x_1)} S_L. \quad\quad 11$$

Where $S_L$ is 630 and $x_1$ 625.1 and $x_2$ 625.2 are the position of the two spots 680.1, 680.2.

As illustrated above, the roles of the light detectors 650 and the light sources 620 may be interchangeable. In an embodiment, the IR transmitter/receiver 690, 695, may be other types of communication, e.g. the movable device 640 may be wired directly to the console 610, or the movable device 640 may communicate with the console 610 using radio waves.

Figure 7:
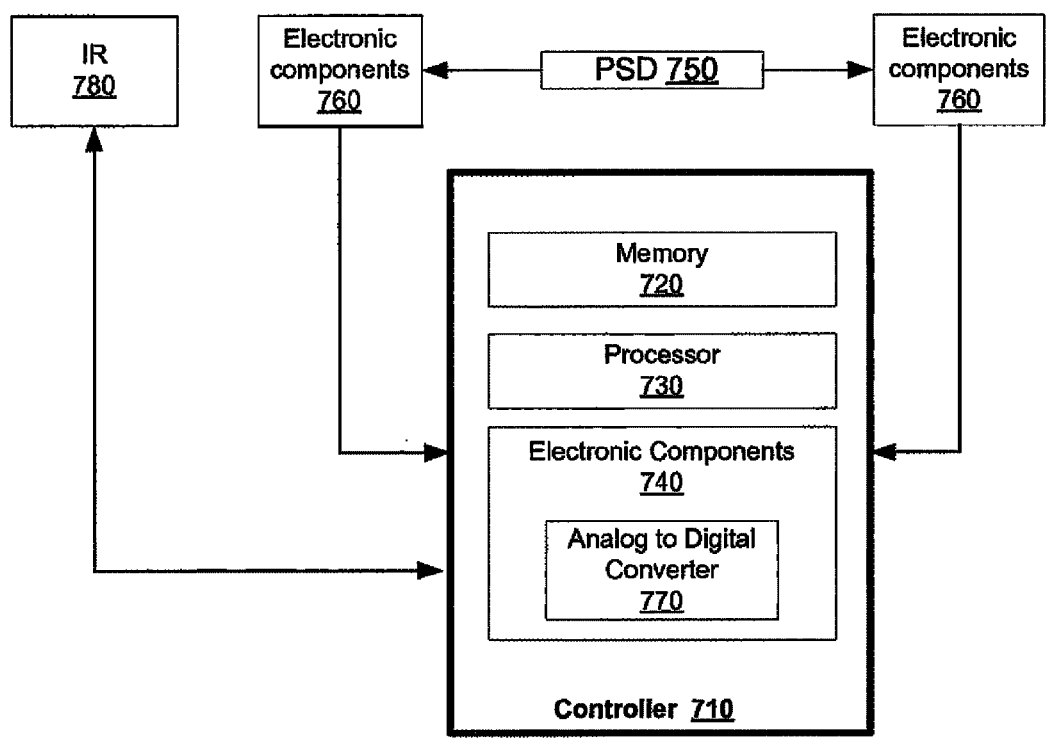
FIG. 7 illustrates an embodiment for the controller.

FIG. 7 illustrates an embodiment for the controller 710. The controller 710 may include one or more memories 720, one or more processors 730, electronic components 740, and the controller 710 may communicate with an infra-red (IR) transmitter and/or receiver 760. The controller 710 may be directly communicatively coupled to one or more optical detectors 750 or PSDs (as illustrated) 750 or the controller 710 may be directly communicatively coupled to electronic components 760, and the electronic components 760 may be directly communicatively coupled to the one or more PSDs 750. The controller 710 may calculate the position of the movable object by receiving data collected from the optical detectors 750. The data may be processed by the electronic components 760 outside the controller 710 before being received by the controller 710. The controller 710 may include an analog to digital converter 770 for converting the analog data from the PSDs 750 and/or the electronic components 760 to digital data for processing by the processor 730. The memory 720 may be RAM and/or ROM and/or any type of memory able to store and retrieve instructions and may include program instructions for determining the position and/or rotation of one or more movable devices. The processor 730 may be a computer processor as is well known in the art.

Multiple controllers 710 may be used to determine the position of the movable device. The controller 710 may perform only part of the calculating necessary to determine the position of the movable device. The electronic components 740, 760 may include operational amplifiers, amplifiers, a differencing and summing instrumentation amplifier configurations to measure the location of the spot of light, analog to digital converters, a pair of current detectors, each coupled to the PSD edges, or two pair of current detectors for a two-dimensional light detectors, simple wires for connecting the current detectors to the other electronic components, a pair of differential amplifiers to compare the left-edge and right-edge currents from each light detector, or other electronic or electrical circuitry for implementing the functionality of the present invention. The electronic components may be positioned or grouped in many ways. For example, there may be one differential amplifier per light detector or the light detectors may share a common differential amplifier or there may be no differential amplifier or there may be one or more differential amplifiers as part of the controller. Positional information for the movable device may be computed entirely by one device or the computations may be divided among two or more devices.

The controller 710 may include a single digital signal processing engine that can separate and track multiple light sources. The controller 710 may receive data from PSDs 750 collected at a remote device and communicated to the controller 710. For example, a remote game controller, which is may include the PSDs 750 and then communicate data from the PSDs 750 to the controller 710 for the controller 710 to calculate the position or rotation of the remote controller. The controller 710 may be communicatively coupled to many optical detectors or PSDs 750 and/or light sources. The controller 710 may be configured to modulate a light source either in time or frequency so that the light source may be distinguished from other light sources. The controller 710 may be configured to calculate the rotation of an object based on the spectrum of light received from multiple light sources.

In an embodiment, the light detectors may be PSDs and the PSDs may be linear light detectors that provide lateral currents at each end (left-edge ($I_L$) and right-edge ($I_R$) currents) that vary depending on the location of incident light on the PSD's surface. The PSDs have a length.

In another embodiment, the PSDs may be two dimensional. There may be four currents provided at each end of the PSDs (left-edge ($I_L$), right-edge ($I_R$), back-end ($I_B$), and front-edge ($I_F$) currents) that vary depending on the location of incident light on the PSD's surface. The light detectors may include many other embodiments.

In an embodiment, optics provided in a common housing with the light detectors focus light from the light sources as a spot on the light detector surface. The imaging optic or optics may be a pin hole, a slit, a fish eye lens, or any type of lens or device that tends to focus the light on the PSD. Positional information may be determined by determining the centroid of the focused light or spot on the PSD surface and by using the focal properties of the imaging optics.

FIG. 8 illustrates embodiments of the present invention. FIG. 8A illustrates an embodiment with three one-dimensional light detectors 810. The light detectors 810 (which may be PSDs) include two one-dimensional light detectors 810 positioned parallel to a first axis 820 (the optics are not illustrated) for determining coordinates of the position of the movable device, and a one dimensional PSD 860 positioned parallel to a second axis 840. The second axis 840 is orthogonally positioned to the first axis 820 for determining one or more coordinates of the position of the movable device. In an embodiment, the light detectors 810, 860 may be differently positioned and still provide the data needed to calculate the position of the movable device. For example, the first axis 820 and second axis 840 need not be orthogonal. In an embodiment, one or more two dimensional light detectors 820, 810 may be used.

Figure 8A:
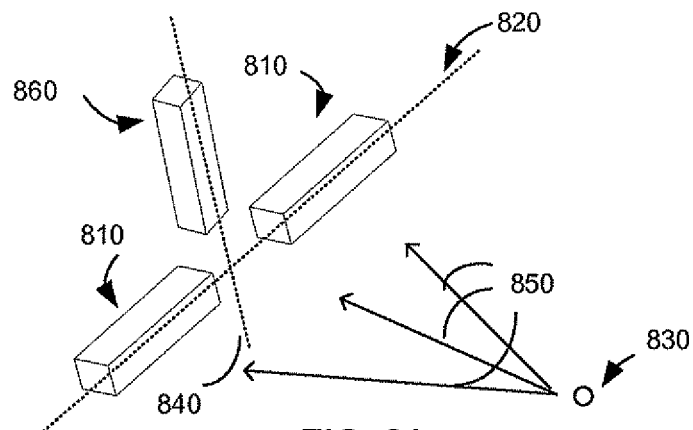
FIG. 8 illustrates embodiments of the present invention.
Figure 8B:
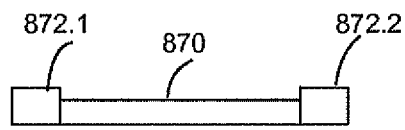

FIG. 8B illustrates a light detector 870, which may be a PSD, integrated with electronic components 872. A light detector 870 is integrated with electronic components 872.1 and 872.2. As discussed herein the electronic components may include many types of components including operational amplifiers, amplifiers, and/or simple wires for connecting the light detectors 870 to other components.

Figure 8C:
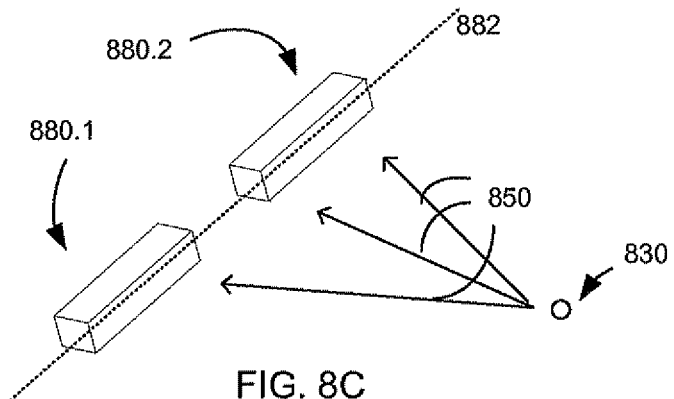

FIG. 8C illustrates two light detectors 880.1 and 880.2, which may be PSDs, with one being two-dimensional. The configuration is adequate for determining all three of the coordinates of position of the movable device. As discussed earlier, the optics together with using properties of the imaging optics is sufficient for determining the third coordinate of the position.

Figure 8D:
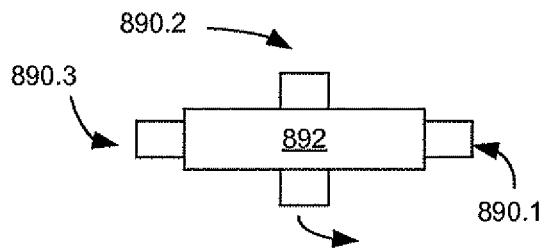

FIG. 8D illustrates a two-dimensional light detector 892 integrated with electronic components 890 on each of the four edges of the light detector 892. In the embodiment where the light detector 892 is a PSD 892, currents would flow radially away from the light centroid (formed as a result of the imaging optics). The data generated by the PSD 892 may be made available at contacts 890.1-890.4 and is processed by the controller (not illustrated) and/or by electronic components to calculate position information. The contacts 890.1-890.4 may include integrated electronic components such as amplifiers.

In an embodiment, multiple stationary consoles may be used. For example, a room may have several light detectors and/or light sources at a game console and game controller may receive or send light to the several light detectors and/or light sources.

FIG. 9 illustrates embodiments of the present invention. FIG. 9A illustrates the movable device 900 with a one light detector 910 or one light source 910. FIG. 9B illustrates the movable device 900 with two light sources 910 or two light detectors 910.

FIG. 9C illustrates the movable device 910 with two light sources 910 or light detectors 910. The movable device 910 is shaped in a manner so that a player of a video game would be less likely to interfere with the transmission of light between the console and the movable device, or the transmission of light between the movable device and the console.

FIG. 9D illustrates the movable device in a rod shape with large light source 910 or a large light detector 910. FIG. 9E illustrates the movable device 900 in a rod shape with many light sources 910 or many light detectors 910.

The many light sources 910 reduce the risk that the person using the movable device will interfere with the light source 910 reaching the console. The many light sources may also be time and/or frequency modulated so that the console can individually calculate the position of the many light sources and use the position information to determine rotational information of the movable device using the methods and apparatuses disclosed herein. The light sources 910 may be light detectors 910 and the many light detectors 910 would reduce the risk that a person would interfere with receiving light from the console. The movable devices 910 may also include other electronic components including sensory feedback devices, input devices and output devices, e.g. input and output devices that are found on game controllers, communication devices for transmitting information to the console, etc. The movable device may be tracked by repeatedly determining the position of the movable device.

Additional light detectors may be used to increase the accuracy of locating the other device (console or movable device) device or to increase the area of sensitivity of the device or to decrease the possible of the light detectors being obstructed. E.g., if the light detectors are located on the movable device, additional light detectors would increase the likelihood of the light detector not being blocked from detecting the light source. Or if two pairs of light detectors were provided on the console then they would be separated to increase the likelihood of detecting the light source.

In embodiments, using the methods and apparatuses described herein all of the six degrees of freedom of the moveable device, the orientation and the coordinates in space, may be calculated.

The light source may be time or frequency modulated to enable differentiating between light sources. The different light sources may be used to provide additional information such as the rotation of the movable device. And/or the different light sources may be used on different movable devices enabling in the case of a game console multi-players or/and for each player to have multiple movable device, e.g. two players each with a movable device per hand and foot. The movable device and/or the console may include both light sources and light detectors.

Figure 10:
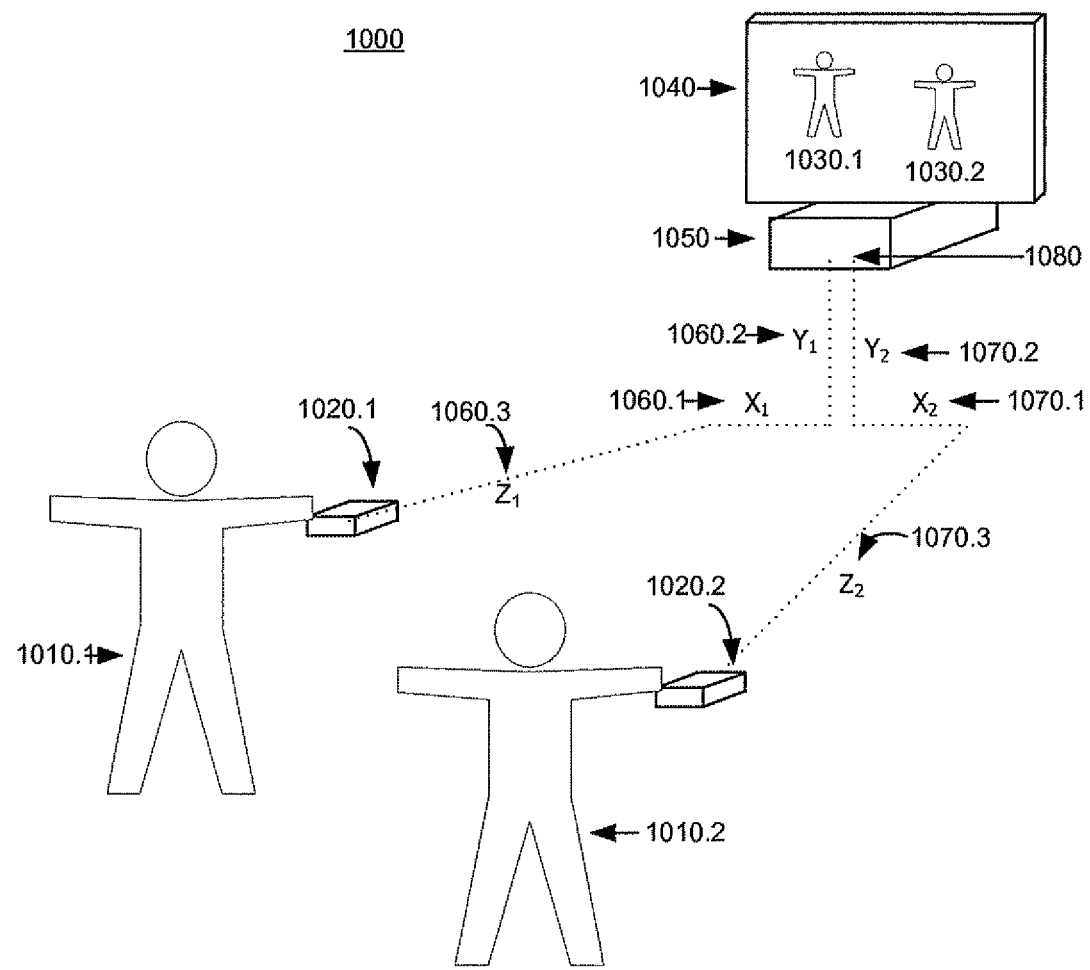
FIG. 10 illustrates an application enabled by the present invention.

FIG. 10 illustrates an application enabled by the present invention. Two players 1010 are holding movable devices 1020.1, 1020.2 or controllers 1020.1, 1020.2. Avatars 1030.1, 1030.2 are displayed on a display 1040 by a game console 1050 for each player 1010.1, 1010.2. The game console 1050 moves the avatars 1030.1, 1030.2 in relation to the movement of the controllers 1020.1, 1020.2. The game console 1050 needs to either be given the position of the controllers 1020.1, 1020.2 or needs to be able to calculate the position of the controllers 1020.1, 1020.2. The position may be given by a coordinate system with reference to the console 1050. For example, the position of controller 1020.1 may be determined by an x 1060.1, y 1060.2, and z 1060.3 coordinate, and the position of controller 1020.2 may be determined by an x 1070.1, y 1070.2, and z 1070.3 coordinate. The console 1050 may be at the origin or zero position of coordinate system 1080. The position of the controllers 1020.1 and 1020.2 may be repeatedly calculated to track the location of the controllers 1020.1 and 1020.2.

The foregoing embodiments provide relatively simple techniques for determining free space position of game controllers and the like. In this manner, these techniques provide significant advantages over alternative techniques, such as those based on image capture techniques where object position would have to be detected from within digital image data. Such image data can include high data rates. For example 480 Megabytes/second in systems using 60 frames/second.

Moreover the foregoing embodiments advantageously provide PSDs that have high bandwidth (10's-1000's of kHz), which enables calculation of the position of the light centroid on the surface of a PSD in a few microseconds. At such calculation rates, the foregoing techniques may provide real-time tracking. In embodiments, the angles of the light sources can be measured due to having accurate measurement of the total light intensity for each of the light sources on the optical detectors.

It should be understood that there exist implementations of other variations and modifications of the invention and its various aspects, as may be readily apparent to those of ordinary skill in the art, and that the invention is not limited by specific embodiments described herein. Features and embodiments described above may be combined. It is therefore contemplated to cover any and all modifications, variations, combinations or equivalents that fall within the scope of the basic underlying principals disclosed and claimed herein.

I claim:

1. A device for calculating a rotation of a movable device, comprising:
an optical detector having a light sensitive surface for generating signals at a plurality of edges of the light sensitive surface that are proportional to a relative location of light on the light sensitive surface with respect to each respective edge;
a controller communicatively coupled to the optical detector, configured to:
calculate length vectors of a distance between (i) a first light source and the optical detector and (ii) a second light source and the optical detector based on the generated signals corresponding to the relative location of light on the light sensitive surface from each of the light sources, and
calculate rotational information of the movable device based on changes to the calculated length vectors of the two light sources as the moveable device is rotated, wherein either the two light sources or the optical detector are part of the movable device;
wherein an angle of the length vectors is calculated based on a comparison of a ratio of the edge location proportional signals generated at the optical detector to a known angular distribution of each of the light sources.

2. The device of claim 1, wherein the controller is further configured to calculate the rotational information based on the spatial distribution pattern of the light received at the optical detector.

3. The device of claim 1, wherein the at least two light sources are used to calculate the rotation of the movable device about one axis and wherein the controller is further configured to:
calculate rotational information about a second axis based on data generated by the optical detector from receiving light from at least two additional light sources of the movable device.

4. The device of claim 1, wherein the controller is further configured to calculate the rotational information when the movable device is rotated in three dimensions.

5. An apparatus for calculating rotational information of a first device with respect to a second device, comprising:
an optical detector having a continuous light sensitive surface included as part of the first device that generates electrical signals proportional to a relative location of light on the light sensitive surface with respect to a plurality of edges of the surface;
a controller communicatively coupled to the optical detector for:
calculating length vectors of distances between a plurality of light sources included as part of the second device and the optical detector based on the generated signals corresponding to the relative location of light on the light sensitive surface from each of the light sources, and
the rotational information of the optical detector based on changes to the calculated length vectors;
wherein an angle of the length vectors is calculated based on a comparison of a ratio of the edge location proportional signals generated at the optical detector to a known angular distribution of each of the light sources.

6. The apparatus of claim 5, wherein the generated signals include at least one analog current signal proportional to an intensity of the detected distribution of light of at least one of the light sources on the continuous light sensitive surface.

7. The apparatus of claim 5, wherein the optical detector is capable of detecting the distribution of light from the plurality of light sources in two dimensions.

8. The apparatus of claim 7, wherein the generated signals include at least one analog current signal for each of the two dimensions proportional to an intensity of the detected distribution of light of at least one of the light sources in each of the two dimensions.

9. The apparatus of claim 5, wherein the first device is a portable device.

10. The apparatus of claim 5, wherein the second device is a portable device.

11. The apparatus of claim 5, further comprising a plurality of optical detectors included as part of the first device, each optical detector having the continuous light sensitive surface that generates electrical signals proportional to a relative location of light on the light sensitive surface with respect to a plurality of edges of the surface, wherein the controller calculates the rotational information of the plurality of optical detectors with respect to the plurality of light sources based on signals generated by plurality of the optical detectors corresponding to detected distributions of light from the plurality of light sources on the continuous light sensitive surface of each optical detector.

12. An apparatus for calculating rotational information of a first device with respect to a second device, comprising:
a plurality of optical detectors included as part of the first device, each optical detector having a continuous light sensitive surface that generates electrical signals proportional to a relative location of light on the light sensitive surface with respect to a plurality of edges of the surface;
a controller communicatively coupled to each optical detector for:
calculating length vectors of distances between a plurality of light sources included as part of the second device and the optical detector based on the generated signals corresponding to the relative location of light on the light sensitive surface from each of the light sources, and
calculating the rotational information of the optical detector based on changes to the calculated length vectors;
wherein an angle of the length vectors is calculated based on a comparison of a ratio of the edge location proportional signals generated at the optical detectors to a known angular distribution of each of the light sources.

13. The apparatus of claim 12, wherein at least one optical detector is capable of detecting the distribution of light from the light source in two dimensions.

14. The apparatus of claim 13, wherein the generated signal at the at least one optical detector capable of detecting the distribution of light from the light source in two dimensions includes at least one analog current signal in each of the two dimensions corresponding to a detected intensity of light in the respective dimension.

15. The apparatus of claim 12, wherein the first device is a portable device.

16. The apparatus of claim 12, wherein the second device is a portable device.

17. The apparatus of claim 12, wherein the controller is capable of calculating the rotational information of at least two of the optical detectors with respect to at least two of the light sources included as part of the second device.

18. A device for calculating a rotation of a movable device, comprising:
an optical detector having a light sensitive surface for generating signals at a plurality of edges of the light sensitive surface that are proportional to a relative location of light on the light sensitive surface with respect to each respective edge;
a controller communicatively coupled to the optical detector, configured to:
calculate length vectors of a distance between a first light source and a second light source, based on the generated signals corresponding to the relative location of light on the light sensitive surface from each of the light sources, and
calculate rotational information of the movable device based on changes to the calculated length vectors of the two light sources as the moveable device is rotated, wherein either the two light sources or the optical detector are part of the movable device,
wherein an angle of the length vectors is calculated based on a comparison of a ratio of the edge location proportional signals generated at the optical detector to a known angular distribution of each of the light sources.

19. The device of claim 18, wherein the optical detector is capable of detecting the distribution of light from the light source in two dimensions.

20. The device of claim 19, wherein the generated signal at the optical detector capable of detecting the distribution of light from the light source in two dimensions includes at least one analog current signal in each of the two dimensions corresponding to a detected intensity of light in the respective dimension.

21. The device of claim 18, wherein the controller is further configured to calculate the rotational information when the movable device is rotated in three dimensions.

22. The device of claim 18, wherein the controller is further configured to calculate the rotational information based on the spatial distribution pattern of the light received at the optical detector.

23. The device of claim 18, wherein the at least two light sources are used to calculate the rotation of the movable device about one axis and wherein the controller is further configured to:

calculate rotational information about a second axis based on data generated by the optical detector from receiving light from at least two additional light sources of the movable device.

\* \* \* \* \*